(12) United States Patent
Wang

(10) Patent No.: US 6,353,082 B1
(45) Date of Patent: Mar. 5, 2002

(54) HIGHLY BRANCHED POLYESTERS THROUGH ONE-STEP POLYMERIZATION PROCESS

(75) Inventor: Jin-Shan Wang, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/697,205

(22) Filed: Oct. 26, 2000

(51) Int. Cl.$^7$ .............................................. C08G 64/00
(52) U.S. Cl. ...................................................... 528/272
(58) Field of Search ........................................ 528/272

(56) References Cited

U.S. PATENT DOCUMENTS

| | | | |
|---|---|---|---|
| 3,669,939 A | 6/1972 | Baker et al. | 528/272 |
| 4,857,630 A | 8/1989 | Kim | 528/397 |
| 5,041,516 A | 8/1991 | Frechet et al. | 528/44 |
| 5,196,502 A | 3/1993 | Turner et al. | 528/272 |
| 5,225,522 A | 7/1993 | Turner et al. | 528/361 |
| 5,227,462 A | 7/1993 | Turner et al. | 528/361 |
| 5,418,301 A | 5/1995 | Hult et al. | 525/437 |
| 5,514,764 A | 5/1996 | Frechet et al. | 528/10 |
| 5,567,795 A | 10/1996 | Vicari et al. | 528/206 |
| 5,663,247 A | 9/1997 | Sorensen et al. | 525/533 |
| 5,663,260 A | 9/1997 | Frechet et al. | 526/292.9 |
| 6,252,025 B1 | 6/2001 | Wang et al. | 526/292.9 |

OTHER PUBLICATIONS

Atsushi Kameyama et al; "Synthesis Of Reactive Polyesters By A Regioselective Addition Reaction Of Diepoxides With Diacyl Chlorides And Their Chemical Modification"; Macromolecules; 1992; vol. 25; pp. 2307–2311.

Paul J. Flory; "Molecular Size Distribution In Three Dimensional Polymers. VI. Branched Polymers Containing A–R–B$_{f-1}$ Type Units", J. Amer. Chem. Soc.; 1952; vol. 74; pp. 2718–2723.

Todd Emrick et al; "An A$_2$ +B$_3$ Approach To Hyperbranded Aliphatic Polyethers Containing Chain End Epoxy Substitutes"; Macromolecules; 1999; vol. 32; pp. 6380–6382.

Mitsutoshi Jikei et al; "Communications To The Editor—Synthesis Of Hyperbranched Aromatic Polyamide From Aromatic Diamines And Trimesic Acid"; Macromolecules; 1999; vol. 32; pp. 2061–2064.

Young H. Kim; "Lyotropic Liquid Crystalline Hyperbranched Aromatic Polyamides"; J. Amer. Chem. Soc.; 1992; vol. 114; pp. 4947–4948.

C. J. Hawker et al; "One–Step Synthesis Of Hyperbranced Dendritic Polyesters"; J. Amer. Chem. Soc.; 1991; vol. 113; pp. 4583–4588.

Jin–Shan Wang; U.S. Ser. No. 09/919,096; filed Jul. 31, 2001; "Highly Branched Polyesters Through One–Step Polymerization Process".

*Primary Examiner*—Terressa M. Boykin
(74) *Attorney, Agent, or Firm*—Andrew J. Anderson

(57) ABSTRACT

A polymerization process for producing highly branched polyesters is disclosed comprising reacting a multi-functional di- or higher epoxide group containing compound with a multi-functional di- or higher acid chloride group containing compound, wherein at least one of the epoxide or acid chloride group containing compounds is a tri- or higher epoxide or acid chloride group containing compound. The invention provides a process for producing highly branched polyesters in one reaction step. The present process comprises a ring opening reaction between a reactant or reactants having multiple epoxide groups and another reactant or reactants having multiple acid chloride groups. The invention has the capability of making highly branched structures of high molecular weight and has the advantages of not requiring multi-step reactions and purification. The invention yields highly branched polyesters having a multiplicity of very reactive epoxy or acid chloride or both on the outside surface which can be further converted to other functional groups, including polymerizable groups and initiating groups, which can undergo further chain extensions.

19 Claims, No Drawings

HIGHLY BRANCHED POLYESTERS THROUGH ONE-STEP POLYMERIZATION PROCESS

FIELD OF THE INVENTION

The present invention relates to processes for the preparation of highly branched functional and reactive polymers. Specifically, the present invention relates to novel highly branched functional and reactive polyesters prepared through a one-step process.

BACKGROUND OF THE INVENTION

Highly branched polymers can be made by multi-step or one step process. Multi-step generation processes were exemplified by Frechet in U.S. Pat. No. 5,041,516 and by Hult in U.S. Pat. No. 5,418,301. Both patents described that the highly branched polymers known as dendrimer or "starburst polymer" were made through a series of growth steps consisting of repeatedly reacting, isolating, and purifying.

One-step process was first conceptualized by Flory (J. Am. Chem. Soc., 74, p2718 (1952)) who demonstrated by theoretical analysis that a highly branched and soluble polymers could be formed from one-step condensation polymerization of monomer comprising the structure $AB_2$, where A and B are reactive groups. In contrast to the dendrimers, the polymer formed by $AB_2$, polymerization is randomly branched. Kim et al in U.S. Pat. No. 4,857,630 disclosed that hyperbranched polyphenylenes can be prepared by one-step polymerization of $AB_2$-type monomers such as (3,5-dibromophenyl)boronic acid and 3,5-dihalophenyl Grignard reagents. Baker in U.S. Pat. No. 3,669,939 described that highly branched aliphatic polyesters could be prepared by one-step melt condensation polymerization of monomers having a single carboxylic acid and multiple alcohols. Hawker et al disclosed that all aromatic, highly branched polyesters can be made by melt polymerization of 3,5-bis(trimethylsiloxy)benzoyl chloride (J. Am. Chem. Soc., 113, p4583 (1991)). U.S. Pat. No. 5,196,502 discloses the use of diacetoxybenzonic acids and monoacetoxydibenzonic acids to produce wholly aromatic polyesters. U.S. Pat. Nos. 5,225,522 and 5,227,462 disclose highly branched aliphatic-aromatic polyesters and processes for making the same. U.S. Pat. No. 5,418,301 discloses a process for preparing dendritic macromolecules. U.S. Pat. No. 5,514,764 discloses preparation of hyperbranched polyester by a one-step process of polymerizing a monomer of the formula $A-R-B_2$. U.S. Pat. No. 5,567,795 discloses synthesis of highly branched polymers in a single processing step by using branching aromatic monomers and an end-capping monomer. U.S. Pat. No. 5,663,247 disclosed a hyperbranched macromolecule of polyester type comprising a central monomeric or polymeric epoxide group containing nucleus and at least one generation of a branching chain extender having at least three reactive sites of which at least one is a hydroxyl or hydroxyalkyl substituted hrodroxyl group and at least one is a carboxyl or terminal epoxide group and the process for making the same.

Most $AB_2$ type monomers, however, are not commercially available, and access to such monomers accordingly involves synthetic efforts, which is potentially problematic, especially on a large scale. To cope with such problem, an $A_2+B_3$ approach to hyperbranched polymers has been recently revisited. In $A_2+B_3$ polymerization, di- and tri-functional monomers are reacted together. For ideal $A_2+B_3$ polymerization, intramolecular cyclization must be minimized as a competing and chain terminating process during polymer propagation, all A groups and all B groups should have near equal reactivity in both the monomers as well as the growing polymers, and the A and B groups should have exclusive reactivity with each other. In view of such requirements, relatively few specific combinations of $A_2+B_3$ polymerization schemes have been proposed. Jikei et al (Macromolecules, 32, 2061 (1999)), e.g., has reported synthesis of hyperbranched aromatic polyamides from aromatic diamines and trimesic acid. Emrick et al (Macromolecules, 32, 6380 (1999)) has disclosed the synthesis of hyperbranched aliphatic polyethers by means of proton-transfer polymerization of 1,2,7,8-diepoxyoctane as $A_2$ monomer and 1,1,1-tris(hydroxymethyl)ethane as $B_3$ monomer.

It is known that ring open reaction between terminal epoxides with acid chlorides, in the presence of tetrabutylammonium bromide, can form an anti-Markinovkov ester product containing a primary chloride. This reaction was applied to dicpoxides and diacid chlorides to form polyesters (Kameyama et al., Macromolecules 25, p.2307 (1992)). However, no prior art teaches the use of multiple epoxides and multiple acid chlorides to prepare highly branched polymers.

It would be desirable to provide a process for producing highly branched polyesters of high molecular weight without requiring the use of $AB_2$ type monomers or multi-step reactions and purification.

It would be further desirable to provide a process which results in highly branched polyesters having a multiplicity of very reactive epoxy or acid chloride groups or both on the outside surface which can be further converted to other functional groups.

SUMMARY OF THE INVENTION

In accordance with one embodiment of the invention, a polymerization process for producing highly branched polyesters is disclosed comprising reacting a multi-functional di- or higher epoxide group containing compound with a multi-functional di- or higher acid chloride group containing compound, wherein at least one of the epoxide or acid chloride group containing compounds is a tri- or higher epoxide or acid chloride group containing compound.

The invention provides a process for producing highly branched polyesters in one reaction step. The present process comprises a ring opening reaction between a reactant or reactants having multiple epoxide groups and another reactant or reactants having multiple acid chloride groups. The invention has the capability of making highly branched structures of high molecular weight and has the advantages of not requiring multi-step reactions and purification. The invention yields highly branched polyesters having a multiplicity of very reactive epoxy or acid chloride or both on the outside surface which can be further converted to other functional groups, including polymerizable groups and initiating groups, which can undergo further chain extensions.

DETAILED DESCRIPTION OF THE INVENTION

The present invention is directed to prepare a highly branched polyester in a single step procedure. The present process utilizes the ring opening reaction of multiple epoxide group containing compounds with multiple acid chloride group containing compounds at a sufficient temperature and for a sufficient period of time to produce a highly branched macromolecule of the polyester type. In accordance with the invention, the use of compounds having multiple reactive epoxide groups in combination with compounds having multiple acid chloride reactive groups has been found to be an especially useful path to providing highly branched polyester materials. The acid chloride groups are in general more reactive than carboxylic acid groups, and the reaction between acid chloride and epoxide groups proceeds under generally less stringent conditions than epoxides and carboxylic acid groups. Further, the acid chloride and epoxide groups can advantageously directly provide highly reactive end groups in the resulting highly branched polymers.

Compounds with multiple reactive epoxide groups which may be used in the process of the invention can be represented by the following formula (I):

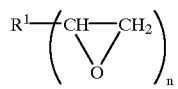
(I)

and compounds with multiple reactive acid chloride groups which may be used in the process of the invention can be represented by the following formula (II):

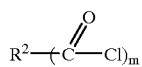
(II)

where $R^1$ and $R^2$ are each independently a monomeric, oligomeric, or polymeric compound nucleus, and n and m are integers between 2 and 100, preferably between 2 and 20, without n and m being 2 at the same time. Each $R^1$ and $R^2$ compound nucleus may comprise, e.g., a straight or branched alkyl, cycloalkyl, aryl or alkylaryl moiety, or an oligomeric or polymeric chain.

In specific embodiments, the multifunctional epoxide group containing compound may be selected from glycidyl esters and ethers of the following formulas (Ia) and (Ib):

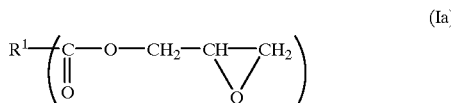
(Ia)

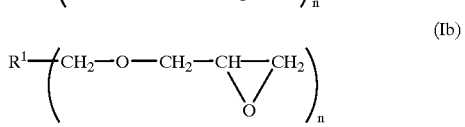
(Ib)

Examples of multiple reactive epoxide group containing compounds include but are not limited to: di or triglycidyl isocyanurate, triphenylolmethane triglycidyl ether, di or triglycidylaniline, N,N-diglycidyl-4-glycidyloxyaniline, 1,2-epoxy-3-allyloxypropane, 1,2-epoxy-3-phenoxypropane, diglycidyl terephthalate, epoxidized soybean fatty acid or oil, epoxidized polyvinylalcohol, poly (glycidyl (meth)acrylates) based homo and copolymers, epoxy resins such as 3,4-epoxy-cyclohexyl methyl 3,4-epoxy cyclohexane, trimethylolethane triglycidyl ether, trimethylopropane triglycidyl ether, poly(dimethyl siloxane) diglycidyl ether, poly(propylene glycol)diglycidyl ether, poly(ethylene glycol) diglycidyl ether, poly[(o-eresyl glycidyl ether)-co-formaldehyde].

Example of multiple reactive acid chloride group containing compounds include but are not limited to: 1,3,6-benzenetricarbonyl trichloride, succinyl chloride, terephthaloyl chloride, malonyl chloride, poly (meth)acryloyl chloride.

Scheme 1 shows an example of the formation of a highly branched polyester in accordance with the invention by reacting triphenylolmethane triglycidyl ether with terephthaloyl chloride:

Scheme 1

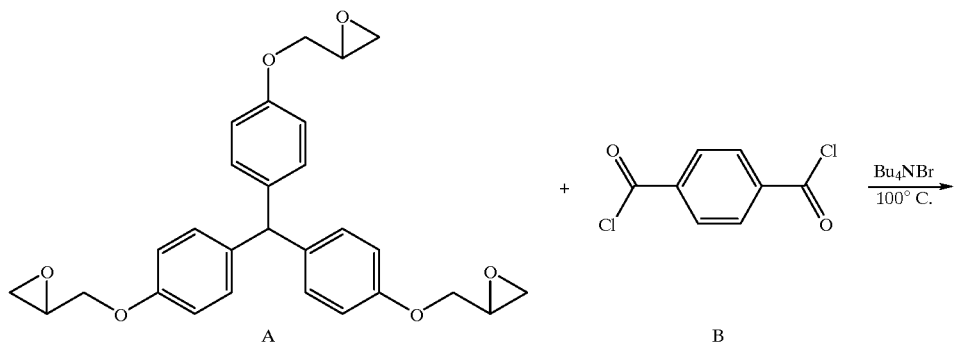

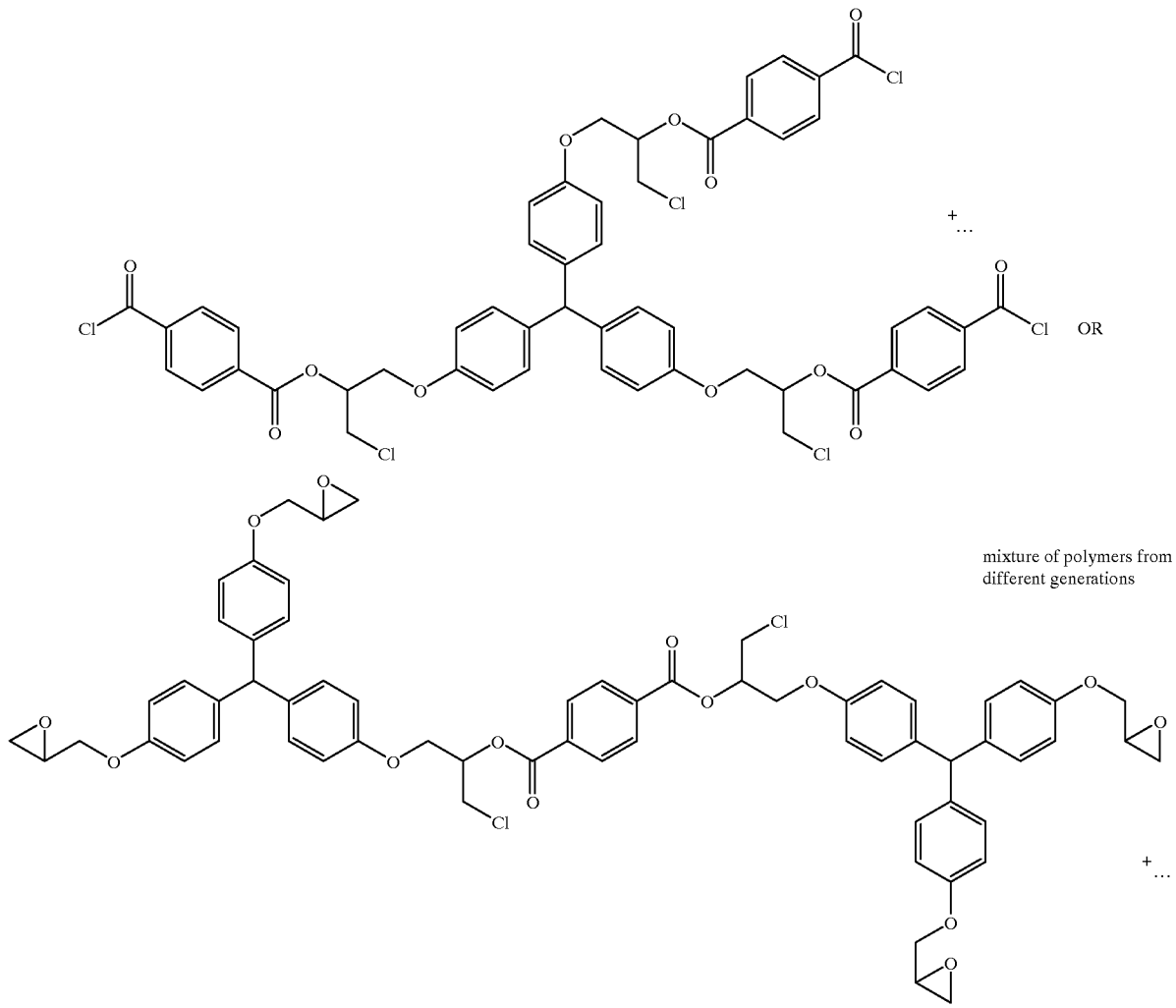

mixture of polymers from different generations

Catalysts may be used to facilitate reaction between the epoxide and acid chloride groups. Preferred catalysts for use in the process of the invention inculde onium salts, polyethers and cryptand based complexes, and amine containing Lewis bases.

Preferred omium salts for use as catalysts inculde but are not limited to: $Me_4N^+Br^-$, $Pr_4N^+Br^-$, $Bu_4N^+Br^-$, $Bu_4P^+Br^-$, $Bu_4N^+Cl^-$, $Bu_4N^+F^-$, $Bu_4N^+I^-$, $Bu_4P^+Cl^-$, $(C_8H_{17})_3NMe^+Cl^-$, $(C_8H_{17})_3PEt^+Br^-$, $C_6H_{13}NEt_3^+Br^-$, $C_7H_{17}NEt_3^+Br^-$, $C_{10}H_{20}NEt_3^+Br^-$, $C_{12}H_{25}NEt_3^+Br^-$, $C_{16}H_{33}NEt_3^+Br^-$, $C_6H_{13}PEt_3^{-Br-}$, $C_6H_5CH_2NEt_3^+Br^-$, $C_{16}H_{33}PMe_3^+Br^-$, $(C_6H_5)_4P^+Br^-$, $(C_6H_5)_4As^+Cl^-$, $(C_6H_5)_4As^+Br^-$, $(C_6H_5)_3PMe^+Br^-$, $(HOCH_2CH_2)_3NBu^+Br$, $Bu_4N^+OH^-$, $Bu_4N^+(ClCrO_3)^-$, $Bu_4N^+CN^-$, $Bu_4N^+BH_3CN^-$, $Bu_4N^+(H_2PO_4)^-$, $Bu_4N^+(H_2PO_2)^-$, $Bu_4N^+1/2(PtCl_6)^-$, $Bu_4N^+PF_6^-$, $Bu_4N^+HSO_4^-$, $Bu_4N^+[CH_3CH(OH)CO_2]^-$, $Bu_4N^+NO_3^-$, $Bu_4N^+IO_4^-$, $Bu_4N^+ReO_4^-$, $Bu_4N^+BF_4^-$, $Bu_4N^+[B(C_6H_5)_4]^-$, $Bu_4N^+[CF_3SO_3]^-$,

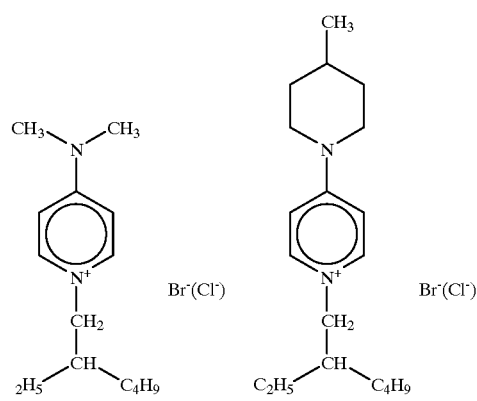

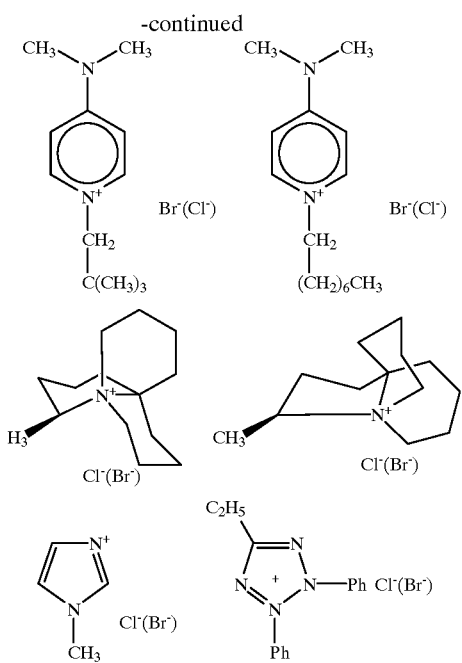

$R_3-N^+(CH_2)_{2-4}O(CH_2)_{2-4}N^+R_3$, $Br^-(Cl^-)$ [where R represents alkyl group]

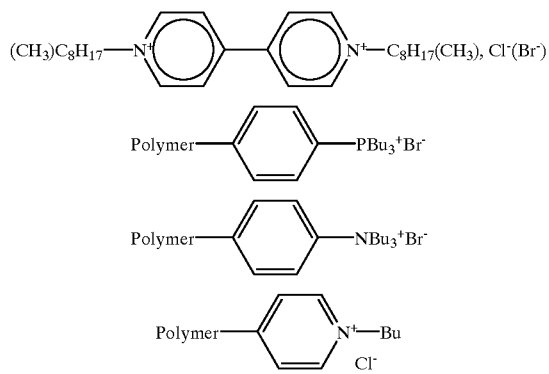

Any polyethers or cryptand based complexes which can facilitate the reaction can be used in the present invention as catalyst. Examples of these compounds include but are not limited to polyethylene glycol and derivatives such as $HO(CH_2CH_2O)_nH$ (n=2–600), $RO(CH_2CH_2O)H$ where $R=C_1$ to $C_3$ alkyl groups, $N(CH_2CH_2OCH_2CH_2OCH_3)_3$, $N(CH_2CH_2OCH_2CH_2OH)_3$, crown ethers and cryptands such as 18-crown-5, 15-crown-5, dibenzo-18-crown-6, dicyclohexano-18-crown-6, Kryptand 211, Kryptanid 222, Kryptand 221.

Any amine containing Lewis bases can also be used in the present invention. Example of these Lewis bases are but not limited to trialkyl substituted amine, pyridine, dimethylaminopyridine.

The amount of catalyst used in the present invention can preferably vary from 0.1% to 30%, more preferably from 0.1% to 10%, and most preferably from 0.1% to 2%, based on the monomer molar concentration.

In a specific embodiment, the resultant highly branched polymers prepared according to the present invention have a multiplicity (e.g., represented by x in Scheme 2 below) of either epoxy or acid chloride or both functional groups on the outside surface. The resulting functional groups on the highly branched polymer surface will depend on polymerization conditions such as the molar ratio of epoxide to acid chloride, monomer concentration, catalyst, polymerization temperature and time, and the like. In preferred embodiments, the reactant concentrations are selected to provide a ratio of epoxide groups to acid chloride groups for the polymerization reaction of greater than 2:1 (resulting in primarily epoxide terminated products) or less than 2:3 (resulting in primarily acid chloride terminated products), as ratios closer to 1:1 (e.g., from about 2:3 to 2:1) have been found to be more prone to crosslinking and gel formation.

In another embodiment, the epoxy or acid chloride groups on the surface of polymer can be easily converted to other types of functional groups by means of organic reactions. Examples of these functional groups include but are not limited to water soluble/dispersible groups, crosslinking groups such as vinyls, initiating and polymerizable groups for further chain extensions, imaging and photographically useful groups such as dyes and couplers, bio-compatible groups, and the like. For example, acid chloride or epoxy end groups can be easily converted into hydrophilic groups such as $-NH_2$, $-COOH$, $-SO_3H$, $-OH$, $-N^+R_3$, and the like as illustrated in Scheme 2.

Scheme 2

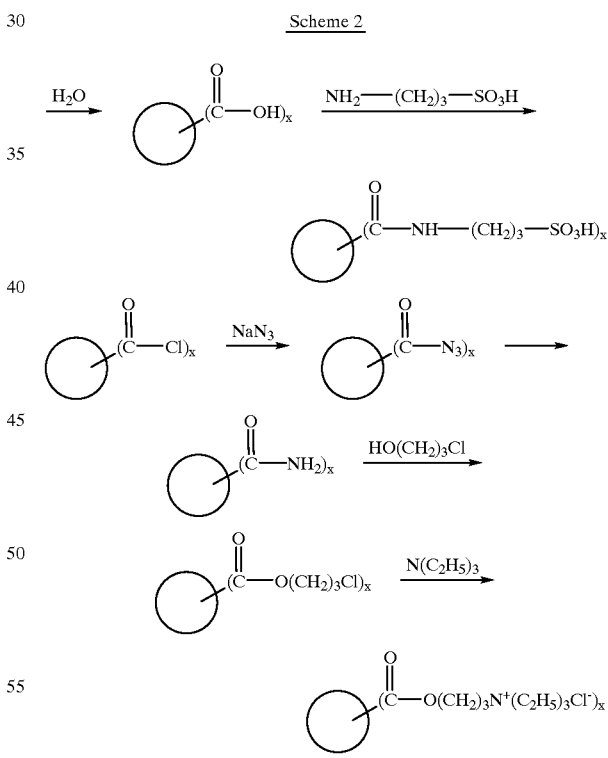

Also, highly branched polymers with various photographically useful end groups as described in copending application U.S. Ser. No. 09/132,045, the disclosure of which is incorporated by reference, can be made via the present invention. For example, a polymeric magenta coupler can be formed as in Scheme 3.

Scheme 3

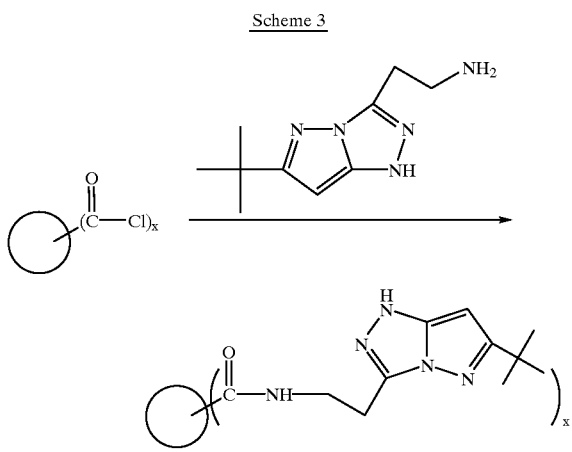

Similarly other types of functional polymers such as surface active polyesters, heat (temperature, pH, and the like)-sensitive smart polyesters, light or electron harvesting polymers, etc., can be obtained.

The functional hyperbranched polymers can also be used for further chain extension to form polymers with higher molecular weight and even more complex architectures. There are two ways to make chain extension.

First, one or more initiating sites can be introduced into the end of hyperbranched polyester. These macroinitiators can be used in any kinds of living and non-living chain polymerizations such as radical, anionic, cationic, group transfer polymerization, atom transfer radical polymerization, telomerization, coordination polymerization, and the like to form polymers with more complex architectures such as star polymers with polyester cores, hyperbranched polyesters based block/graft/super branched polymers and the like. Thus, the present invention provides a method to make even complex polymers or copolymers comprising polyesters and vinyl polymers in the same molecule.

For example, a macroinitiator for Atom Transfer Radical Polymerization (ATRP, as described, e.g., in U.S. Pat. Nos. 5,789,487 and 5,807,937, the disclosures of which are incorporated by reference) can be made by modification of epoxy ended highly branched polymer with trichloroacetyl chloride (Scheme 4) and can be used in ATRP of methyl methacrylate (Scheme 5):

Scheme 4

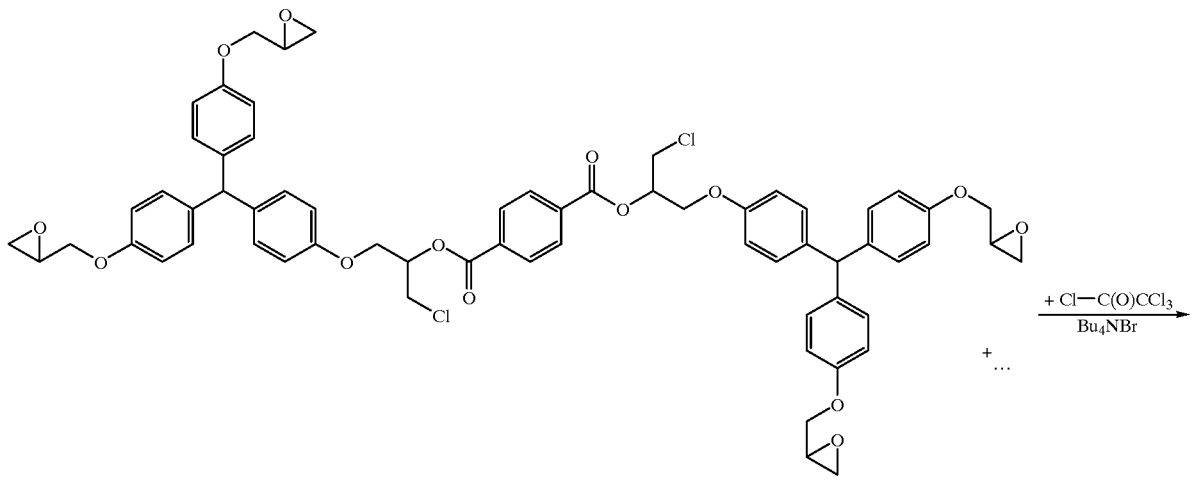

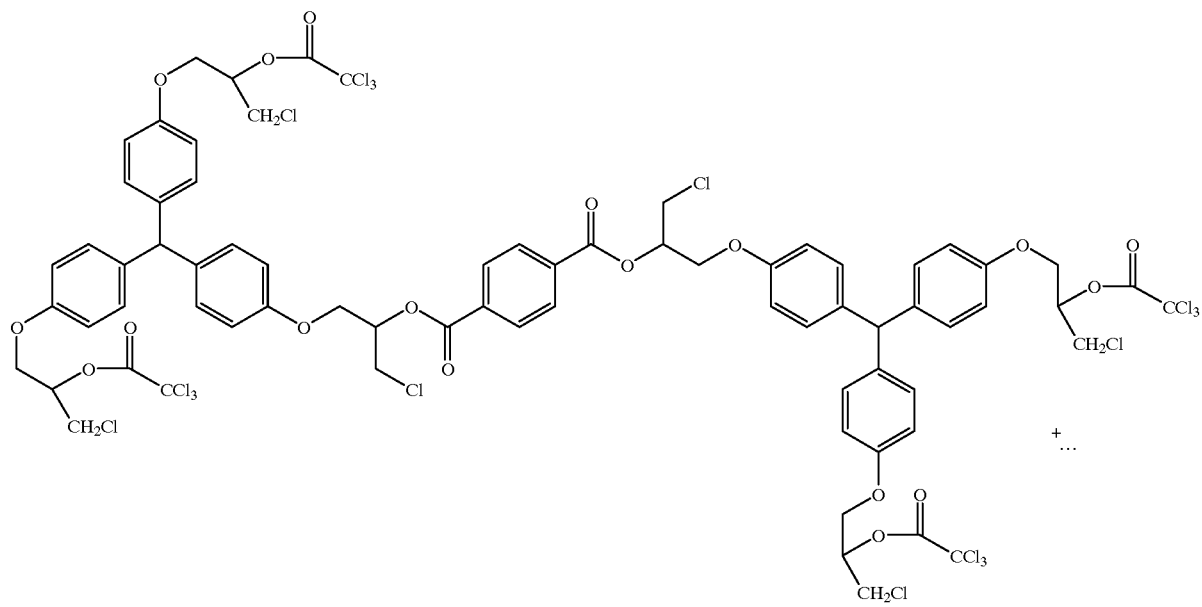
30
35
Scheme 5
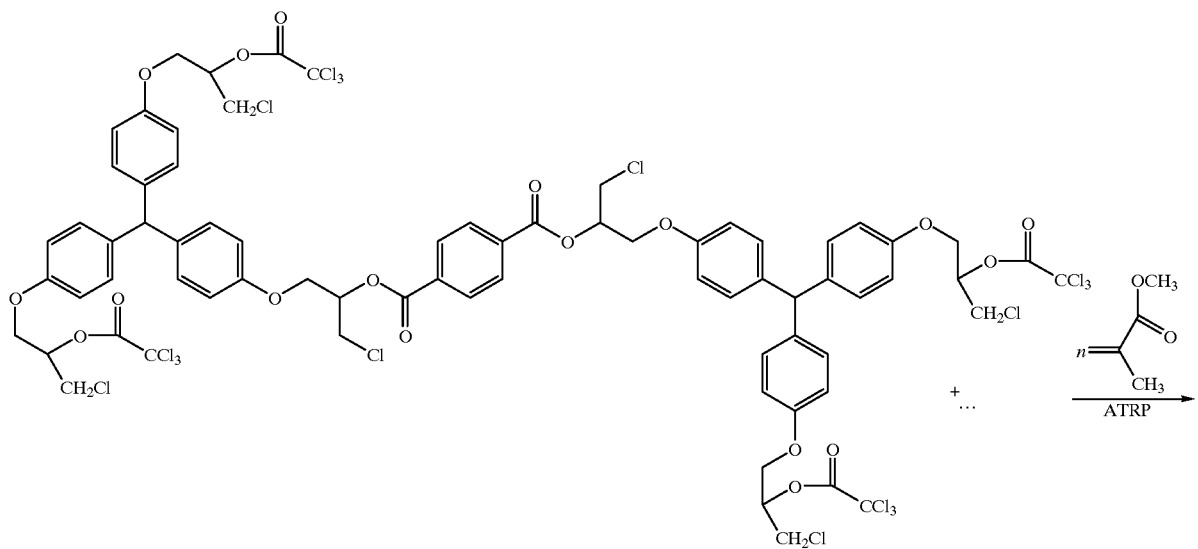

-continued

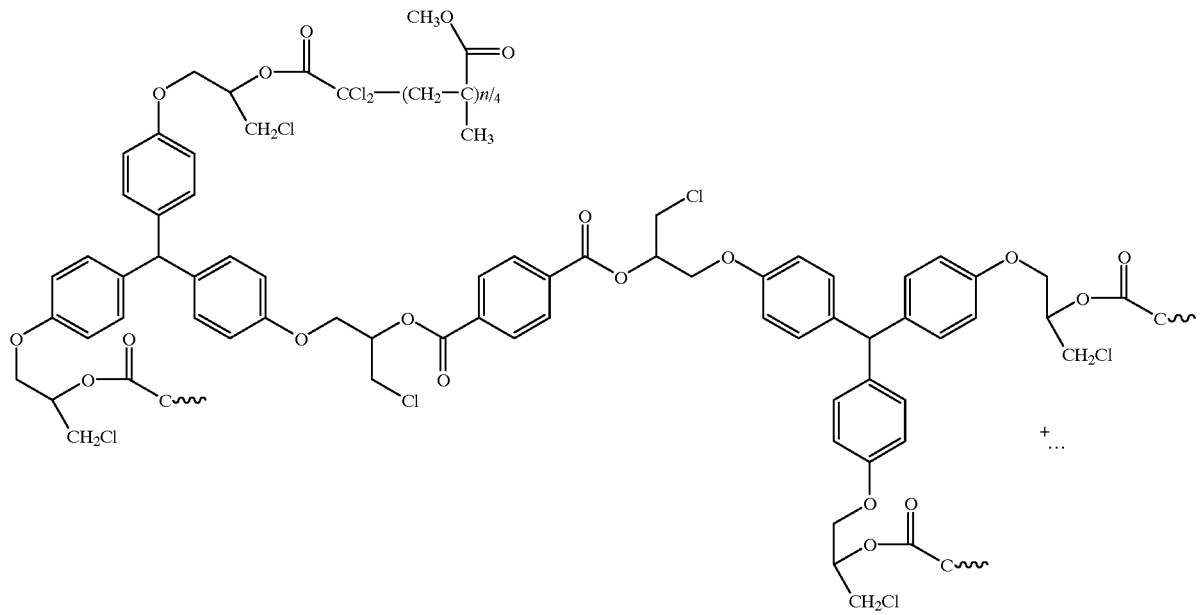

Alternatively, epoxy and acid chloride ended hyperbranched polyesters can react with any mono- or multiple functional monomers such as amine, OH, epoxy, acid chloride containing condensation type of monomers to form even more complex polymers or copolymers.

For example, the reaction between multiple acid chloride ended hyperbranched polyester and diepoxides yields a highly branched polyesters with higher molecular weight (Scheme 6).

Scheme 6

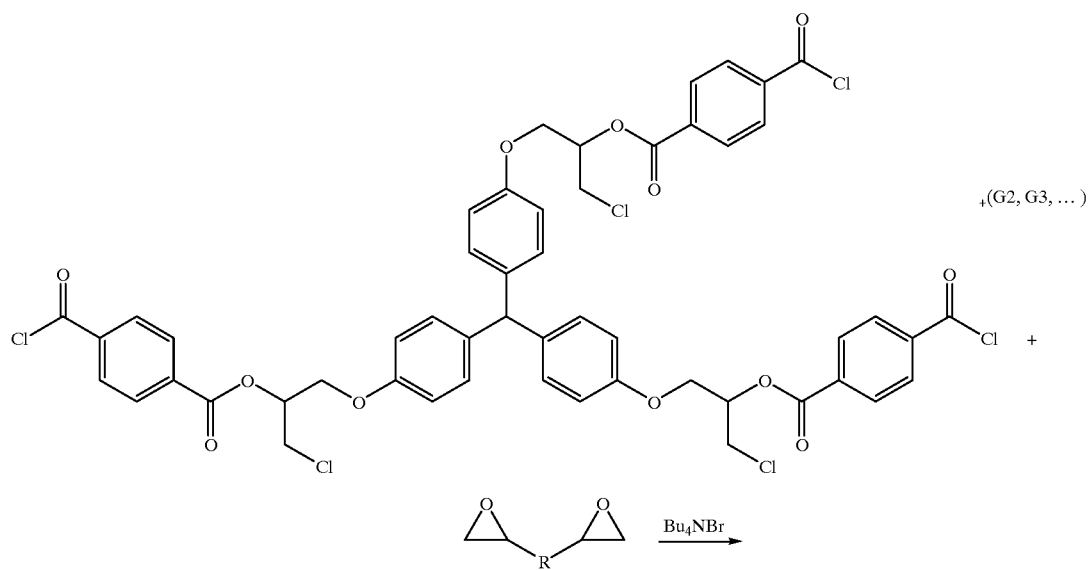

-continued

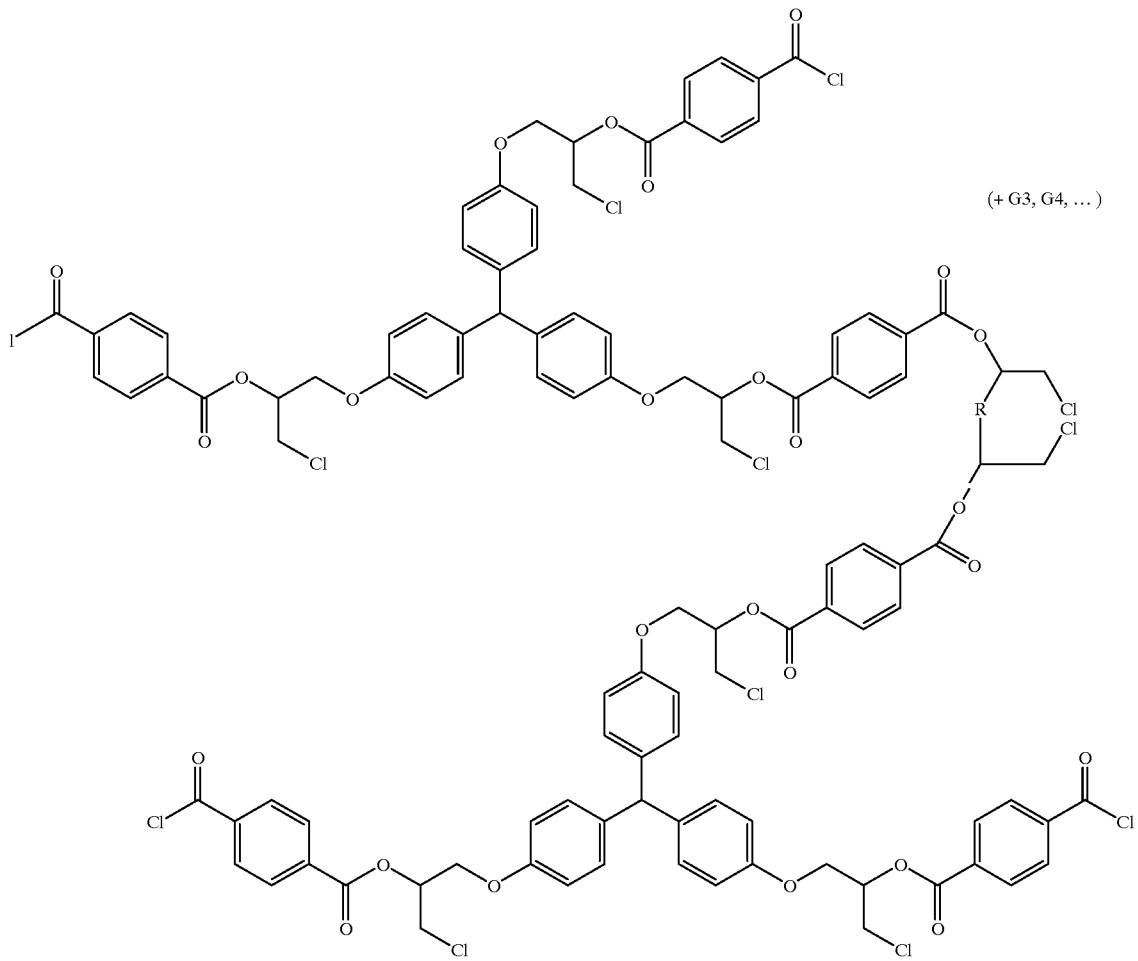

(+ G3, G4, ... )

(where G2, G3, G4, . . . represents second, third, fourth, etc. generations).

As another example, the reaction between multiple acid chloride ended hyperbranched polyester and mono $NH_2$ containing polyether compounds such as Jeffamine™ (Huntsman) compounds may result in hydrophiphilic star copolymer with highly branched polyester as the core and Jeffamine™ as the branches.

The present polymerization process may be conducted as bulk polymerization, i.e., in absence of solvent. However, it can also be carried out in any solvent, which might include but are not limited to ethers, cyclic ethers, alkanes, cycloalkanes which may be substituted, aromatic solvents, halogenated hydrocarbon solvents, acetonitrile, dimethylformamide, ethylene carbonate, dimetliylsulfoxide, dimethylsulfone, sulfolane, alcohol, water, mixture of such solvents, and supercritical solvents such as carbon dioxide, alkanes in which any H may be replaced with F, etc. Preferred solvents include toluene, cyclohexanone, anisole, o-dichlorobenzene, DMF, sulfolane, ethyl benzene.

The present process may also be conducted in accordance with known suspension, emulsion, microemulsion, gas phase, dispersion, precipitation, template, reactive injection molding, phase transfer polymerization processes, melting polymerization, and the like.

The polymerization can be conducted in accordance with known batch, semi-batch, continuing processes, tube-flow, and the like. The polymerization temperature can be varied from $-200$ to $500°$ C., more typically from $-100$ to $200°$ C., and preferably from 20 to $120°$ C. Polymerization pressure may typically vary from $10^{-8}$ atm to $10^{-3}$ atm. Combinatorial chemistry and experimental design can be used in the context of the present invention to optimize the polymerization reaction conditions.

The molecular weight and molecular distribution of polymers prepared in accordance with the present invention may vary from about 100 to $10^{-8}$ and from 1.001 to 100, respectively, and the glass transition temperatures from $-300$ to $1000°$ C. depending upon the polmerization reactant compositions.

The final polymers can be purified with known processes such as precipitation, extraction, and the like. Polymers can be used in the forms of solid particle, solution, dispersion, latex, and the like.

The highly branched polymers and copolymers prepared in the present invention can be used in a variety of applications such as plastics, elastomers, fibers, engineering resins, coatings, paints, adhesives, asphalt modifiers, detergents, diagnostic agents and supports, dispersants, emulsifiers, rheology modifiers, viscosity modifiers, in ink and imaging compositions, as leather and cements additives, lubricants, surfactants, as paper additives, as intermediates for chain extensions such as polyurethanes, as additives in ink jet, printing, optical storage, photography, photoresist, and coloration of polymer, as water treatment chemicals, cosmetics, hair products, personal care products, polymeric dyes, polymeric couplers, polymeric developers, antistatic agents, in food and beverage packaging, pharmaceuticals, carriers for drug and biological materials, slow release agent formulations, crosslinking agents, foams, deodorants, porosity control agents, complexing and chelating agents, carriers for chiral resolution agents, catalysts, carriers for gene transfection, for encapsolation, as light harvesting materials, as non-linear optical materials, and to form super macromolecular assemble.

EXAMPLES

The invention can be better appreciated by reference to the following specific embodiments.

Examples 1–8
Polymerization of Triphenylolmethane Triglycidyl Ether with Terephthaloyl Chloride A typical example of synthesis of fully aromatic polyesters by using aromatic acid chlorides and aromatic epoxides is described as following. Terephthaloyl chloride (2.012 g, 9.9103 mmol) and tetrabutylammonium bromide (0.319 g, 0.9895 mmol) were charged into a 25 ml air-filee flask along with a stir bar in the diy box. The flask was septumed and removed from the diy box. Tiiphenylolmethane tiiglycidyl ether (1.51 g, 3.2788 mmol) and 7 ml of toluene were added and the solution was still ed at 100° C. in a nitrogen atmosphere for one hour. The product was precipitated in 250 ml of methanol, collected via suction filtration and dried in the vacuum oven. The polymer was characterized by GPC to determine the molecular weight and molecular weight distribution as defined by the ratio of weight average molecular weight (Mw) to number average molecular weight (Mn). GPC of final polymer: Mn=1990, Mw/Mn=2.70. The synthesis was repeated, but with varying concentrations of terephthaloyl chloride and tniphenylolmethane tuiglycidyl ether.

The polymerization of the triphenylolmethane triglycidyl ether with terepthaloyl chloride may result in products with different generations, differen molecular weights, different branching degrees, different end groups, which are dependent of polymerization conditions. Table 1 shows the effects of the ratio of the epoxide groups to the acid chloride groups of the treiphenylolmethane triglycidyl ether and terephthaloyl chloride reactants on the formation of polymers with different end groups.

Example 9
Polymerization of Triphenylolmethane Triglycidyl Ether (1 molar equiv.) with Succinyl Chloride (3 molar equiv.)

The polymerization process is similar to the one in example 1–8. GPC analysis of final product: Mn=2200, Mw/Mn=6.77. The epoxide/acid chloride group ratio of 1/2 resulted in a predominately acid chloride group terminated product.

Example 10
Polymerization of N,N-Diglycidyl-4-glycidyloxyaniline (2 molar with Terephthaloyl Chloride (1 molar equiv.) in Toluene The polymerization process is similar to the one in example 1–8. GPC analysis of final product: Mn=2010, Mw/Mn=2.42. The epoxide/acid chloride group ratio of 3/1 resulted in a predominately epoxide group terminated product.

Example 11
Esterification of Acid Chloride Ended Hyperbranched Polyester with Glycidyl 1,1,2,2-tetrafluoroethyl Ether The acid chloride ended hyperbranched polyester as produced in example 6 (1 gram, Mn=1070) was dissolved in 2 ml toluene in a 10 ml round bottom flask. A solution containing 0.5 grams of glycidyl 1,1,2,2-tetrafluoroethyl ether, 0.0178 grams of $Bu_4NBr$, and 2 ml of toluene was added to the above solution. The mixture was stirred at 100° C. under a $N_2$ atmosphere for 5 hours. The product was precipitated in 50 ml of methanol to give a white powder product. $^1H$ NMR spectrum of the product show a complete esterification.

Example 12
Esterification of Acid Chloride Ended Hyperbranched Polyester with 2,2,2-trifluoroethanol The acid chloride ended hyperbranched polyester as produced in example 6 (25 grams, Mn=1070) was dissolved in 50 ml 2,2,2-trifluorotoluene in a 250 ml round bottom flask. 14 grams of 2,2,2-trifluoroethanol was dropwise added to the above solution. The mixture was stirred at 100° C. under a N2 atmosphere for 0.5 hours. The product was precipitated in 1000 ml of methanol to give a white powder product. $^1H$ NMR spectrum of the product show a complete esterification.

Example 13
Amidation of Acid Chloride Ended Hyperbranched Polyester with Jeffamine™ M-715

TABLE 1

Polymerization Results of Triphenylolmethane triglycidyl ether with terephthaloyl chloride

| Example |  /  | Observation |
| --- | --- | --- |
| 1 | 1/1 | gel |
| 2 | 2/1 | gel |
| 3 | 3/1 | Predominately epoxide terminated products |
| 4 | 5/1 | Predominately epoxide terminated products |
| 5 | 1/1.4 | gel |
| 6 | 1/2 | Predominately acid chloride terminated products |
| 7 | 1/3 | Predominately acid chloride terminated products |
| 8 | 1/5 | Predominately acid chloride terminated products |

The acid chloride ended hyperbranched polyester as produced in example 6 (1 gram, Mn=1070) and 2.7 grams of Jeffamine™ M-715 (Huntsman) were mixed with 4 ml of toluene in a 10 ml round bottom flask. The solution was allowed to react at room temperature for 15 min. $^1$H NMR of the product showed the formation of a star polymer.

Example 14
Esterfication of Acid Chloride Ended Hyperbranched Polyester with 2-chloroethanol To a 100 ml round bottom flask, 6.8 grams of 2-chloroethanol, the acid chloride ended hyperbranched polyester as produced in example 6 (20 grams, Mn=1070), and 0.19 grams of triethylamine were mixed with 40 ml of toluene. The solution was stirred at room temperature for 1 hr. Polymer was precipitated from methanol and dried under vacuum. $^1$H NMR spectrum showed the formation of the expected esterified product.

Example 15
Quaternization of 2-chloroethanol-esterfied Polymer with 2-(dimethylamino)ethanol To a 50 ml round bottom flask, 5 grams of polymer as produced in example 14 was dissolved in 17 ml of DMF. 3.7 grams of 2-(dimethylamino)etlhanol was added to the above solution and the mixture was stirred at 60° C. for 5 hrs. A fine white powder product was obtained by precipitation from cold methanol and dried under vacuum. $^1$H NMR spectrum showed the folmation of the expected quarternized product. The product is partially soluble in acetone or in water, and completely soluble in acetone/water (10/90 by volume) mixture.

Example 16
Hydrolysis of Acid Chloride Ended Hyperbranched Polyester Polymer

To a 25 ml round bottom flask, 1 gram of the acid chloride ended polymer as produced in example 6 was dissolved in 2 ml of acetone. A mixture of 0.11 grams of deionized water, 0.1 ml of 50% sodium hydroxide, and 2 ml of acetone was dropwise added to the above solution over 30 min. After another 30 minutes, the product was precipitated out from 50 ml acetone and dried under the vacuum. The resulting hydrolyzed product is dispersible in water.

Example 17
Formation of Hyperbranched Polyester with Sulfonic Acidic end Groups

For the sulfonation of the epoxy ended hyperbranched polyester, sodium sulfite (1.80 g, 14.2811 mmol) was added into a 25 mL round bottom flask along with a stir bar. Tetrabutylammonium bromide (1.15 g, 3.5672 mmol) and 10 mL of water were added and the solution was stirred. The epoxy ended polyester as produced in example 3 (5.00 g, Mn=1120) was added along with I mL of chloroform. The flask was connected to a condenser and the resulting suspension was allowed to stir at 80° C. for 60 hours. After the allotted reaction time, the aqueous layer was decanted and methylene chloride was added to the organic layer. The organic solution was washed twice with water and stripped of solvent with a rotary evaporator prior to drying in the vacuum. The resulting sulfonated product was dispersible in water, and with a few drops of acetone in water became soluble.

Example 18
Preparation of Macro-initiator

To a 50 ml 3-neck flask, 10 grams of epoxy-ended hyperbranched polyester as produced in example 3 (Mn= 1120) and 0.125 grams of tetrabutylammonium chloride.x xH2O were dissolved in 25 ml of toluene. 5 ml of trichloroacetyl chloride was dropwise added to the polymer solution at 0° C. over 10 minutes period of time. After the addition was complete, the ice bath was removed and the solution allowed to stir at room temperature for another 2 hours 15 minutes. The product was precipitated out from 250 ml of methanol and was dried under the vacuum to provide a macroinitiator molecule comprising a highly branched polyester nucleus and multiple initiating end groups.

Example 19
Synthesis of Star Polymer

Star polymer with hyperbranched polyester as core can be synthesized by any living or non-living polymerization processes using hyperbranched polyester-containing macroinitiator. For example, a star polymer with hyperbranched polyester as core and poly (2-chloroethyl methacrylate) as the arms can be produced as follows. To a 10 ml air free flask, 1.0 gram of macroinitiator (Mn=11300) as prepared in example 18, 1.0 gram of 2-chloroethyl methacrylate, 0.92 grams of tetrabutylammonium bromide, and 0.62 grams of ferrous bromide were dissolved in 5 ml of toluene. The suspension mixture was purged with $N_2$ for 15 minutes and stirred at 70° C. in a $N_2$ atmosphere for 22 hours. The resulting star polymer product was precipitated out from 250 ml of methanol and was dried under the vacuum. GPC analysis of the product gave Mn=5610 and Mw/Mn=2.5.

Example 20
Chain Extension to Increase Molecule Weight

To a 10 mL airfree flask, the acid chloride-ended hyperbranched polyester as produced in example 6 (2.00 g, Mn=1070), tetrabutylammonium bromide (0.0931 g), N,N-diglycidylaniline (0.19 g) and 6 mL of toluene were added. The solution was stirred at 100° C. for 1 hour in a nitrogen atmosphere. Polymer was precipitated from methanol and dried under the vacuum. GPC analysis of the final product gives Mn=3500, and Mw/Mn=1.75.

Example 21
Synthesis of Hyperbranched Polyester with Attached Photographic Coupler The acid chloride-ended hyperbranched polymer as produced in example 3 (3 grams, Mn=1070) was dissolved in 15 mL of THF in a beaker. A magenta dye forming coupler intermediate (3.4 g) with the following structure:

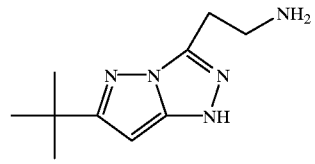

was added into a 250 mL round bottom flask along with a stir bar. Triethylamine (0.24 g) and 35 mL of THF were added and nitrogen was allowed to bubbling through it. The polymer solution was added dropwise and the resulting solution was allowed to stir for 60 minutes. After the allotted reaction time, the product was precipitated in 500 mL of water. The product was collected, redissolved in 50 mL of THF, reprecipitatcd in 500 mL of 10% aqueous methanol, redissolved in 50 mL of THF and reprecipitated in 500 mL of hexane. The powder was collected by suction filtration and dried in the vacuum oven. The dried powder was further purified by extraction with water for 3 days and then dried under the vacuum. 1H NMR analysis confirmed formation of a polymeric photographic coupler.

The invention has been described in detail with particular reference to certain preferred embodiments thereof, but it will be understood that variations and modifications can be effected within the spirit and scope of the invention.

What is claimed is:

1. A polymerization process for producing highly branched polyesters comprising reacting epoxide groups of multi-functional di- or higher epoxide group containing compound reactant with acid chloride groups of multi-functional di- or higher acid chloride group containing compound reactant to form ester products, wherein at least one of the epoxide or acid chloride group containing compound reactants is a tri- or higher epoxide or acid chloride group containing compound, and the reaction product comprises a highly branched macromolecule of the polyester type.

2. A process according to claim 1, comprising reacting a di- or higher epoxide group containing compound with a tri- or higher acid chloride group containing compound.

3. A process according to claim 1, comprising reacting a tri- or higher epoxide group containing compound with a di- or higher acid chloride group containing compound.

4. A process according to claim 1, wherein the epoxide group containing compound is of the formula (I):

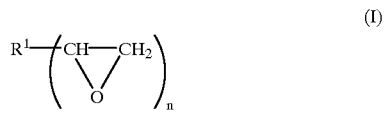

and the acid chloride group containing compound is of the formula (II):

where $R^1$ and $R^2$ are independently monomeric, oligomeric, or polymeric compound nuclei, and n and m are integers between 2 and 100, without n and m being 2 at the same time.

5. A process according to claim 4, wherein n is 2 and m is 3.

6. A process according to claim 4, wherein n is 3 and m is 2.

7. A process according to claim 4, wherein each of n and m are between 2 and 20.

8. A process according to claim 4, wherein $R^1$ and $R^2$ each comprise a straight or branched alkyl, cycloalkyl, aryl or alkylaryl moiety.

9. A process according to claim 1, wherein the epoxide group containing compound is a glycidyl ester of the formula (Ia):

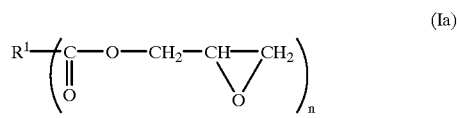

and the acid chloride group containing compound is of the formula (II):

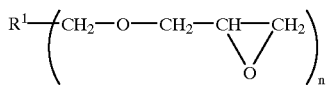

where $R^1$ and $R^2$ are independently monomeric, oligomeric, or polymeric compound nuclei, and n and m are integers between 2 and 100, without n and m being 2 at the same time.

10. A process according to claim 1, wherein the epoxide group containing compound is a glycidyl ether of the formula (Ib):

and the acid chloride group containing compound is of the formula (II):

where $R^1$ and $R^2$ are independently monomeric, oligomeric, or polymeric compound nuclei, and n and m are integers between 2 and 100, without n and m being 2 at the same time.

11. A process according to claim 1, wherein the epoxide group containing compound is a di or triglycidyl isocyanurate, triphenylolmethane triglycidyl ether, di or triglycidylaniline, N,N-diglycidyl-4-glycidyloxyaniline, 1,2-epoxy-3-allyloxypropane, 1,2-epoxy-3-phenoxypropane, diglycidyl terephthalate, epoxidized soybean fatty acid or oil, epoxidized polyvinylalcohol, poly (glycidyl (meth)acrylates) based polymer, 3,4-epoxy-cyclohexyl methyl 3,4-epoxy cyclohexane, trimethylolethane triglycidyl ether, trimethylopropane triglycidyl ether, poly(dimethyl siloxane) diglycidyl ether, poly (propylene glycol)diglycidyl ether, poly(ethylene glycol) diglycidyl ether, or poly[(o-cresyl glycidyl ether)-co-formaldehyde].

12. A process according to claim 1, wherein the acid chloride group containing compound is a 1,3,6-benzenetricarbonyl trichloride, succinyl chloride, terephthaloyl chloride, malonyl chloride, or poly (meth)acryloyl chloride.

13. A process according to claim 1, wherein the polymerization is performed in the presence of an onium salt, polyether or cryptand based complex, or amine containing Lewis base as a catalysts.

14. A process according to claim 1, wherein the reactant concentrations are selected to provide a ratio of epoxide groups to acid chloride groups for the polymerization reaction of greater than 2:1 or less than 2:3.

15. A process according to claim 1, wherein the reactant concentrations are selected to provide a ratio of epoxide groups to acid chloride groups for the polymerization reaction of greater than 2:1 and results in a primarily epoxide terminated product.

16. A process according to claim 1, wherein the reactant concentrations are selected to provide a ratio of epoxide groups to acid chloride groups for the polymerization reaction of less than 2:3 and results in a primarily acid chloride terminated product.

17. A process according to claim 1, wherein the epoxide group containing compound is triphenylolmethane triglycidyl ether and the acid chloride group containing compound is terephthaloyl chloride.

18. A process according to claim 1, wherein the epoxide group containing compound is triphenylolmethane triglycidyl ether and the acid chloride group containing compound is succinyl chloride.

19. A process according to claim 1, wherein the epoxide group containing compound is N,N-Diglycidyl-4-glycidyloxyaniline and the acid chloride group containing compound is terephthaloyl chloride.

* * * * *